(12) United States Patent
Bronson et al.

(10) Patent No.: US 8,141,365 B2
(45) Date of Patent: Mar. 27, 2012

(54) PLUNGED HOLE ARRANGEMENT FOR ANNULAR RICH-QUENCH-LEAN GAS TURBINE COMBUSTORS

(75) Inventors: Thomas J. Bronson, Mesa, AZ (US); Frank Joseph Zupanc, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 485 days.

(21) Appl. No.: 12/394,656

(22) Filed: Feb. 27, 2009

(65) Prior Publication Data
US 2010/0218503 A1    Sep. 2, 2010

(51) Int. Cl.
F23R 3/06    (2006.01)
F23R 3/50    (2006.01)

(52) U.S. Cl. ............... 60/754; 60/752; 60/755; 60/804

(58) Field of Classification Search ............ 60/752, 60/754, 755, 759, 804
See application file for complete search history.

(56) References Cited

U.S. PATENT DOCUMENTS

| | | | | |
|---|---|---|---|---|
| 2,807,139 | A | * | 9/1957 | Jackson .................. 60/754 |
| 3,593,518 | A | * | 7/1971 | Gerrard .................. 60/752 |
| 3,735,589 | A | | 5/1973 | Caruel et al. |
| 4,392,355 | A | * | 7/1983 | Verdouw ................. 60/752 |
| 4,698,963 | A | | 10/1987 | Taylor |
| 4,805,397 | A | * | 2/1989 | Barbier et al. ............ 60/759 |
| 5,187,937 | A | * | 2/1993 | Stevens et al. ........... 60/759 |
| 5,241,827 | A | | 9/1993 | Lampes |
| 5,819,540 | A | | 10/1998 | Massarani |
| 5,996,351 | A | | 12/1999 | Feitelberg et al. |
| 6,101,814 | A | | 8/2000 | Hoke et al. |
| 6,286,298 | B1 | | 9/2001 | Burrus et al. |
| 6,810,673 | B2 | | 11/2004 | Snyder |
| 7,065,972 | B2 | | 6/2006 | Zupanc et al. |
| 2006/0272335 | A1 | | 12/2006 | Schumacher et al. |
| 2007/0193248 | A1 | * | 8/2007 | Bessagnet et al. ........ 60/39.01 |
| 2008/0127651 | A1 | | 6/2008 | Zupanc et al. |
| 2008/0134682 | A1 | * | 6/2008 | Garry et al. ............ 60/752 |
| 2009/0100840 | A1 | | 4/2009 | Campion et al. |
| 2009/0139239 | A1 | | 6/2009 | Zupanc et al. |
| 2010/0095679 | A1 | * | 4/2010 | Rudrapatna et al. ....... 60/752 |

OTHER PUBLICATIONS

U.S. Appl. No. 11/947,337.
U.S. Appl. No. 12/256,246.
Lefebvre, A.H.; "Gas Turbine Combustion", Hemisphere Publishing, 1984, pp. 141-148.

(Continued)

Primary Examiner — Ted Kim
(74) Attorney, Agent, or Firm — Ingrassia Fisher & Lorenz, P.C.

(57) ABSTRACT

A combustor may include an outer liner having a first row and a second row of circumferentially distributed air admission holes. The second row of the outer liner may be downstream of the first row of the outer liner, and the air admission holes of the first row of the outer liner may be larger than the air admission holes of the second row of the outer liner. An inner liner is circumscribed by the outer liner and has a third and fourth row of circumferentially distributed air admission holes. The air admission holes of the third row of the inner liner may be larger than the air admission holes of the fourth row of the inner liner. The inner and outer liners may form a combustion chamber, and at least a portion of the air admission holes of the first, second, third, or fourth rows may be plunged.

17 Claims, 5 Drawing Sheets

OTHER PUBLICATIONS

Doerr, T., Blomeyer, M., and Hennecke, D.K.; "Experimental Investigation of Optimum Jet Mixing Configurations for RQL Combustors", ISABE (International Symposium on Air Breathing Engines), 1995.

Lincinsky, D.S., True, B., Vranos, A., Holdeman, J.D.; "Experimental Study of Cross-Stream Mixing in a Rectangular Duct", AIAA Paper 92-3090, 28th Joint Propulsion Conference, 1992.

USPTO Office Action for U.S. Appl. No. 12/394,725, Notification date Sep. 16, 2011.

* cited by examiner

PLUNGED HOLE ARRANGEMENT FOR ANNULAR RICH-QUENCH-LEAN GAS TURBINE COMBUSTORS

FIELD OF THE INVENTION

The following discussion generally relates to gas turbine engine combustors, and more particularly, to a quench jet arrangement for reducing NOx emissions from annular rich burn, quick-quench, lean burn (RQL) gas turbine engine combustors.

BACKGROUND OF THE INVENTION

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is typically positioned at the front, or "inlet" section of the engine, and includes a fan that induces air from the surrounding environment into the engine and accelerates a fraction of this air toward the compressor section. The remaining fraction of air induced into the fan section is accelerated into and through a bypass plenum and out the exhaust section.

The compressor section raises the pressure of the air it receives from the fan section to a relatively high level. The compressed air from the compressor section then enters the combustor section, where a ring of fuel nozzles injects a steady stream of fuel into a combustion chamber formed between inner and outer liners. The fuel and air mixture is ignited to form combustion gases. The combustion gases then flow into and through the turbine section, thereby causing rotationally mounted turbine blades to rotate and generate energy. The gases exiting the turbine section are exhausted from the engine via the exhaust section.

There is an increasing desire to reduce gaseous pollutant emissions, particularly oxides of nitrogen (NOx), that form during the combustion process. One approach to reduce NOx emissions is the implementation of a rich burn, quick quench, lean burn (RQL) combustion concept. A combustor configured for RQL combustion includes three serially arranged combustion zones: a rich burn zone at the forward end of the combustor, a quench or dilution zone downstream of the rich burn zone, and a lean burn zone downstream of the quench zone. By precisely controlling the zone stoichiometries between the air and fuel, high-temperature excursions can be reduced and the resulting NOx emissions can be minimized. The effectiveness of the RQL concept, however, is primarily dependent on the design of the quench section of the combustor in which the fuel-rich gases from the rich burn zone are rapidly mixed with excess air and passed to the lean burn zone. The design and development of the quench zone geometry is one of the challenges in the successful implementation of low-emissions RQL combustors.

Accordingly, it is desirable to provide a combustor with improved NOx emissions. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with an exemplary embodiment, a combustor for a turbine engine includes an outer liner having a first row and a second row of circumferentially distributed air admission holes penetrating therethrough. The second row of the outer liner may be downstream of the first row of the outer liner, and the air admission holes of the first row of the outer liner may be larger than the air admission holes of the second row of the outer liner. The combustor further includes an inner liner circumscribed by the outer liner and having a third row and a fourth row of circumferentially distributed air admission holes penetrating therethrough. The fourth row of the inner liner may be downstream of the third row of the inner liner, and the air admission holes of the third row of the inner liner may be larger than the air admission holes of the fourth row of the inner liner. The inner and outer liners may form a combustion chamber, and at least a portion of the air admission holes of the first, second, third, or fourth rows may be plunged.

In accordance with another exemplary embodiment, a method is provided for combusting an air-fuel mixture in a combustor with an inner liner and an outer liner that define a combustor chamber therebetween. The method may include directing first major and minor jets respectively through first and second rows of plunged air admission holes in the outer liner; directing second major and minor jets respectively through third and fourth rows of plunged air admission holes in the inner liner; introducing and mixing fuel with the first major and minor jets and the second major and minor jets; and igniting the air-fuel mixture.

In accordance with yet another exemplary embodiment, a combustor for a turbine engine may include an outer liner having a first row and a second row of circumferentially distributed plunged air admission holes penetrating therethrough. The second row of the outer liner may be downstream of the first row of the outer liner, and the air admission holes of the first row of the outer liner may be larger than the air admission holes of the second row of the outer liner. The combustor may include an inner liner circumscribed by the outer liner and forming a combustion chamber therewith. The inner liner may include a third row and a fourth row of circumferentially distributed plunged air admission holes penetrating therethrough, with the fourth row of the inner liner being downstream of the third row of the inner liner. The air admission holes of the third row of the inner liner may be larger than the air admission holes of the fourth row of the inner liner. The combustor may further include a plurality of fuel injectors extending into the combustion chamber and configured to deliver an air-fuel mixture to the combustion chamber. Each of the plurality of fuel injectors may be associated with two air admission holes in the first row, two air admission holes in the third row, four air admission holes in the second row, and two air admission holes of the fourth row. The third row of air admission holes may be generally aligned with the first row of air admission holes in a longitudinal direction. The fourth row of air admission holes may be generally aligned with the second row of air admission holes in the longitudinal direction. The fourth row of air admission holes may be circumferentially offset with respect to the first row of air admission holes, and the second row of air admission holes may be circumferentially offset with respect to the third row of air admission holes.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Broadly, exemplary embodiments discussed herein relate to combustors of gas turbine engines. In particular, in one exemplary embodiment, the combustors include liners with air admission holes arranged in a 2-2-4-2 staggered configuration. The air admission holes may be plunged to enable a greater penetration and mixing in the quick quench portion of the combustor.

Figure 1:
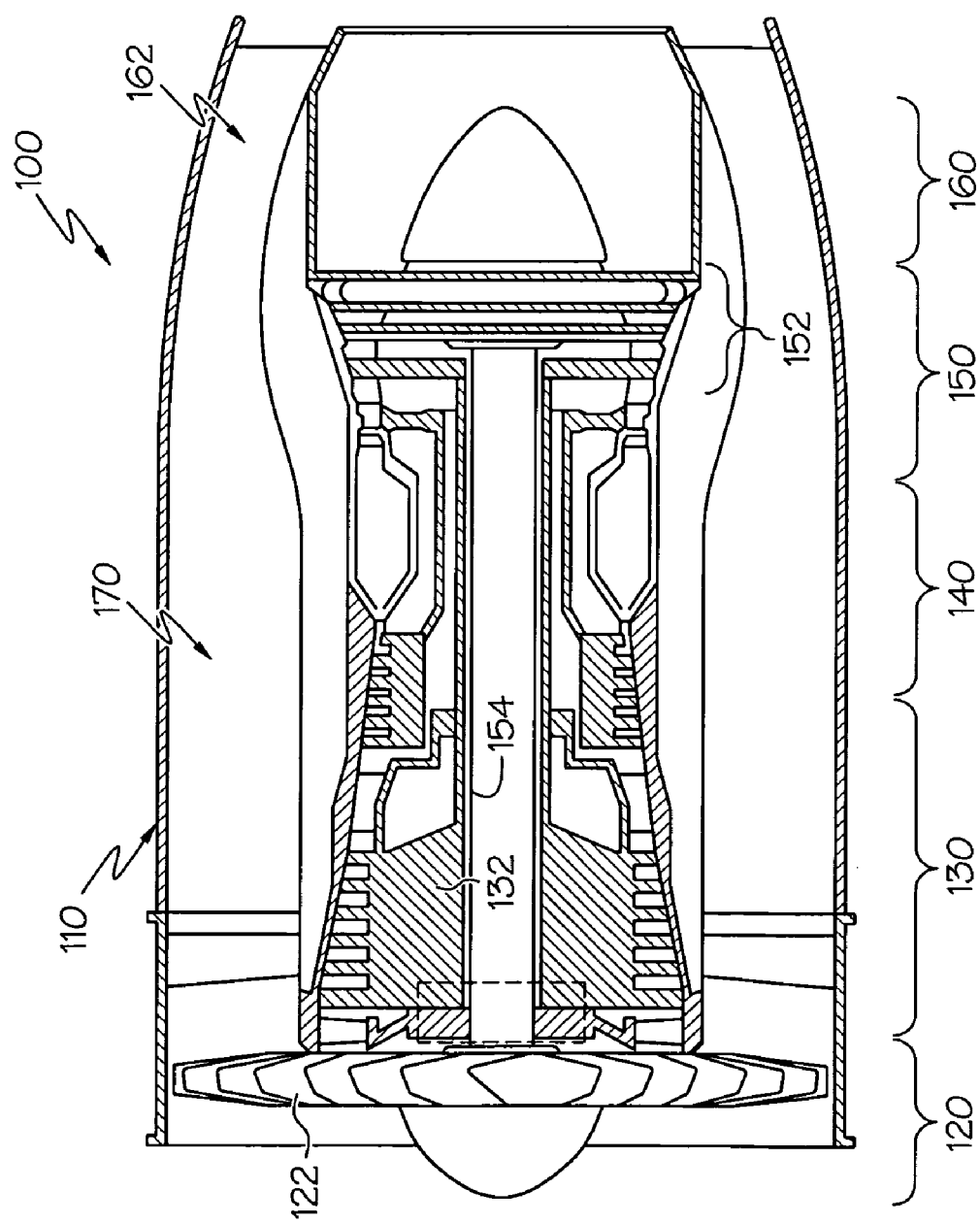
FIG. 1 is a cross-sectional view of a gas turbine engine according to an exemplary embodiment.

FIG. 1 is a simplified, cross-sectional view of a gas turbine engine 100, according to an embodiment. The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132, which raise the pressure of the air directed into it from the fan 122. The compressors 132 may direct the compressed air into the combustion section 140. In the combustion section 140, the high pressure air is mixed with fuel and combusted. The combusted air is then directed into the turbine section 150.

The turbine section 150 may include a series of turbines 152, which may be disposed in axial flow series. The combusted air from the combustion section 140 expands through the turbines 152 and causes them to rotate. The air is then exhausted through a propulsion nozzle 162 disposed in the exhaust section 160, providing additional forward thrust. In an embodiment, the turbines 152 rotate to thereby drive equipment in the engine 100 via concentrically disposed shafts or spools. Specifically, the turbines 152 may drive the compressor 132 via one or more rotors 154.

Figure 2:
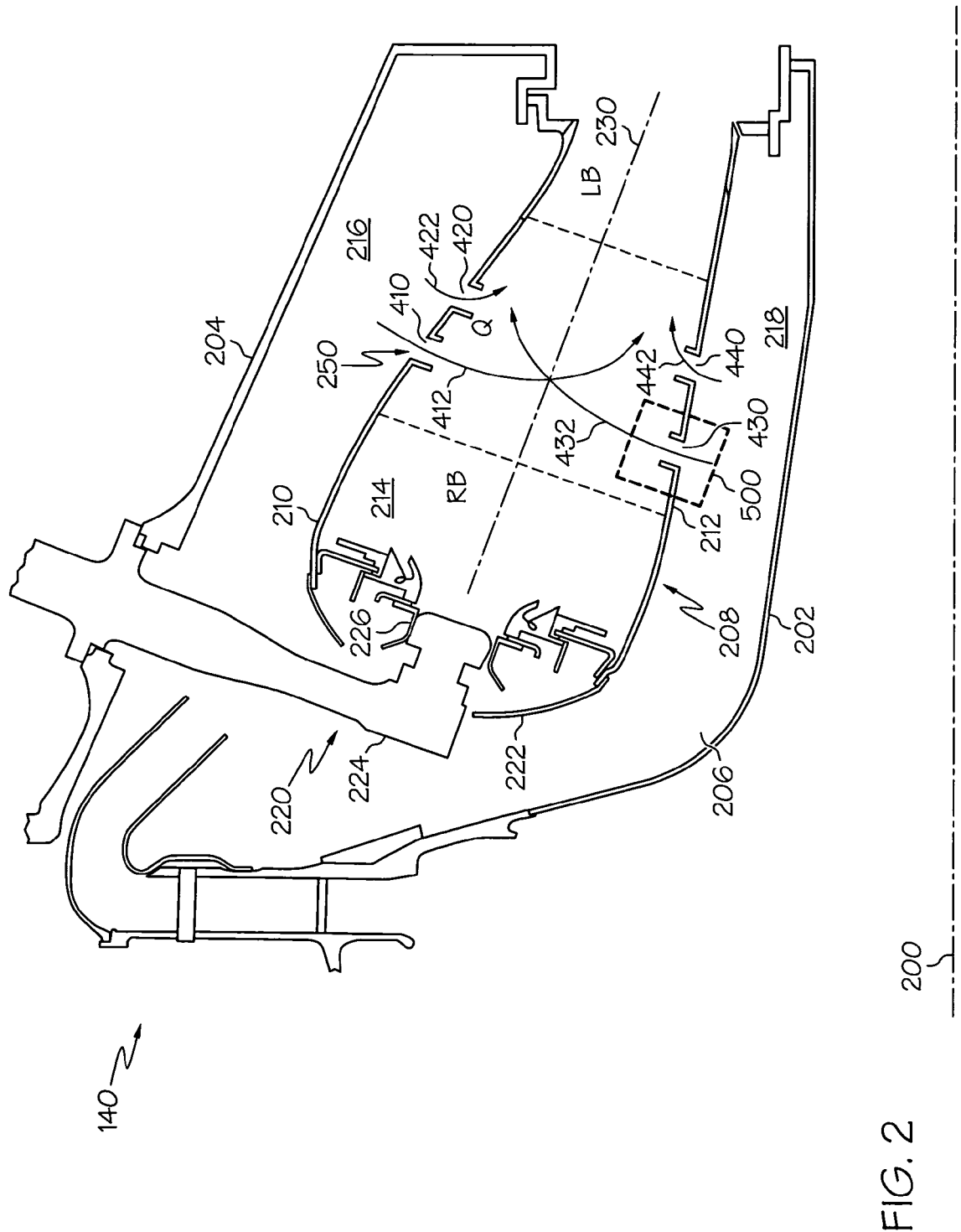
FIG. 2 is a partial, cross-sectional side elevation view of the combustor section of FIG. 1 according to an exemplary embodiment.

FIG. 2 is a more detailed cross-sectional view of the combustion section 140 of FIG. 1. In FIG. 2, only half the cross-sectional view is shown; the other half may be substantially rotationally symmetric about a centerline and axis of rotation 200.

The combustion section 140 substantially includes a radially inner case 202 and a radially outer case 204 concentrically arranged with respect to the inner case 202. The inner and outer cases 202, 204 circumscribe the axially extending engine centerline 200 to define an annular pressure vessel 206. The combustion section 140 also includes a combustor 208 residing within the annular pressure vessel 206. The combustor 208 is defined by an outer liner 210 and an inner liner 212 that is circumscribed by the outer liner 210 to define an annular combustion chamber 214. The liners 210, 212 cooperate with cases 202, 204 to define respective outer and inner air plenums 216, 218.

The combustor 208 includes a front end assembly 220 comprising a shroud assembly 222, fuel injectors 224, and fuel injector guides 226. One fuel injector 224 and one fuel injector guide 226 are shown in the partial cross-sectional view of FIG. 2. In one embodiment, the combustor 208 includes a total of sixteen circumferentially distributed fuel injectors 224, but it will be appreciated that the combustor 208 could be implemented with more or less than this number of injectors 224. Each fuel injector 224 is secured to the outer case 204 and projects through a port to introduce a swirling, intimately blended fuel and air mixture that supports combustion in the combustion chamber 214.

Figure 3:
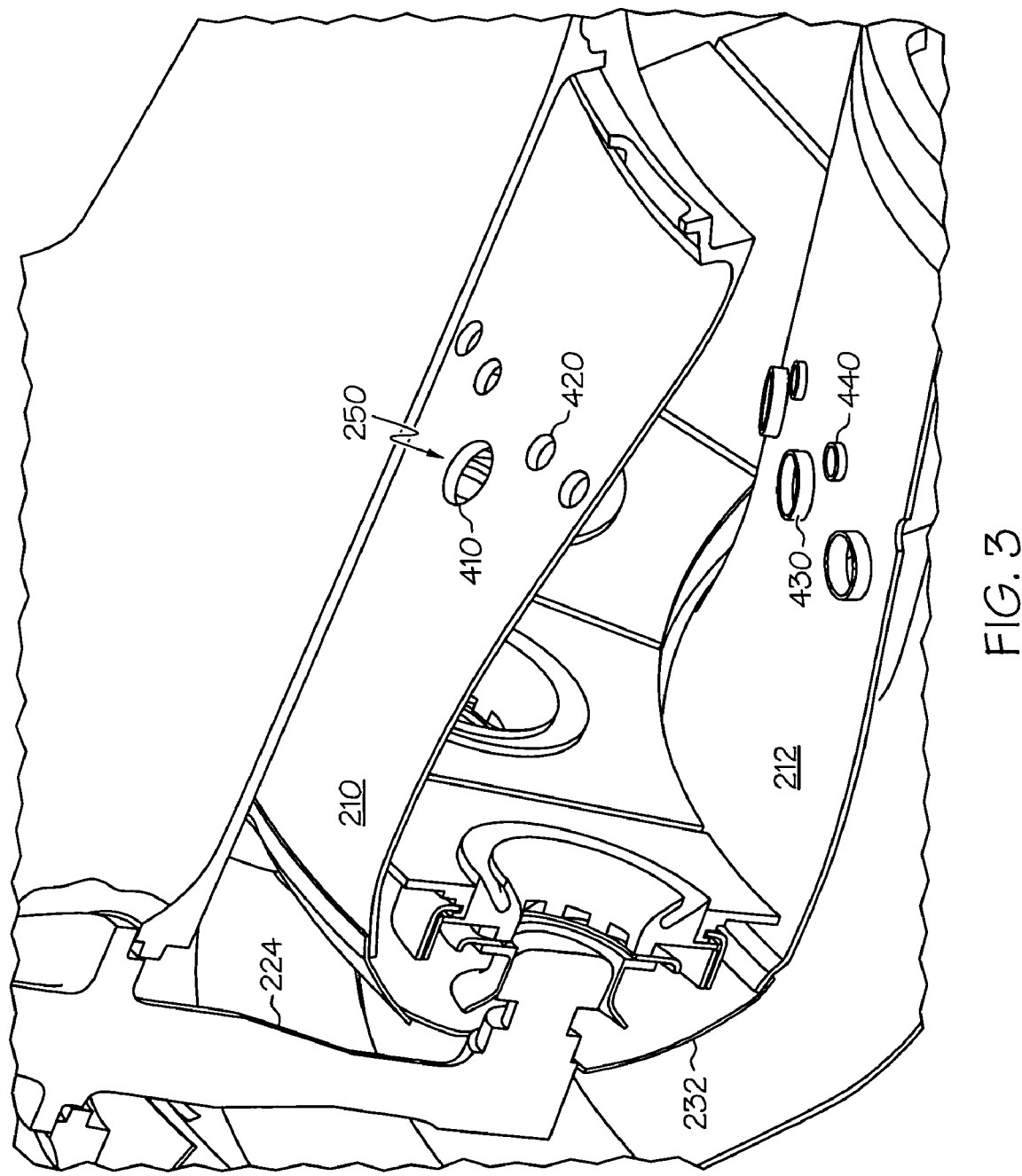
FIG. 3 is a partial, perspective view of the combustor of FIG. 2.
Figure 4:
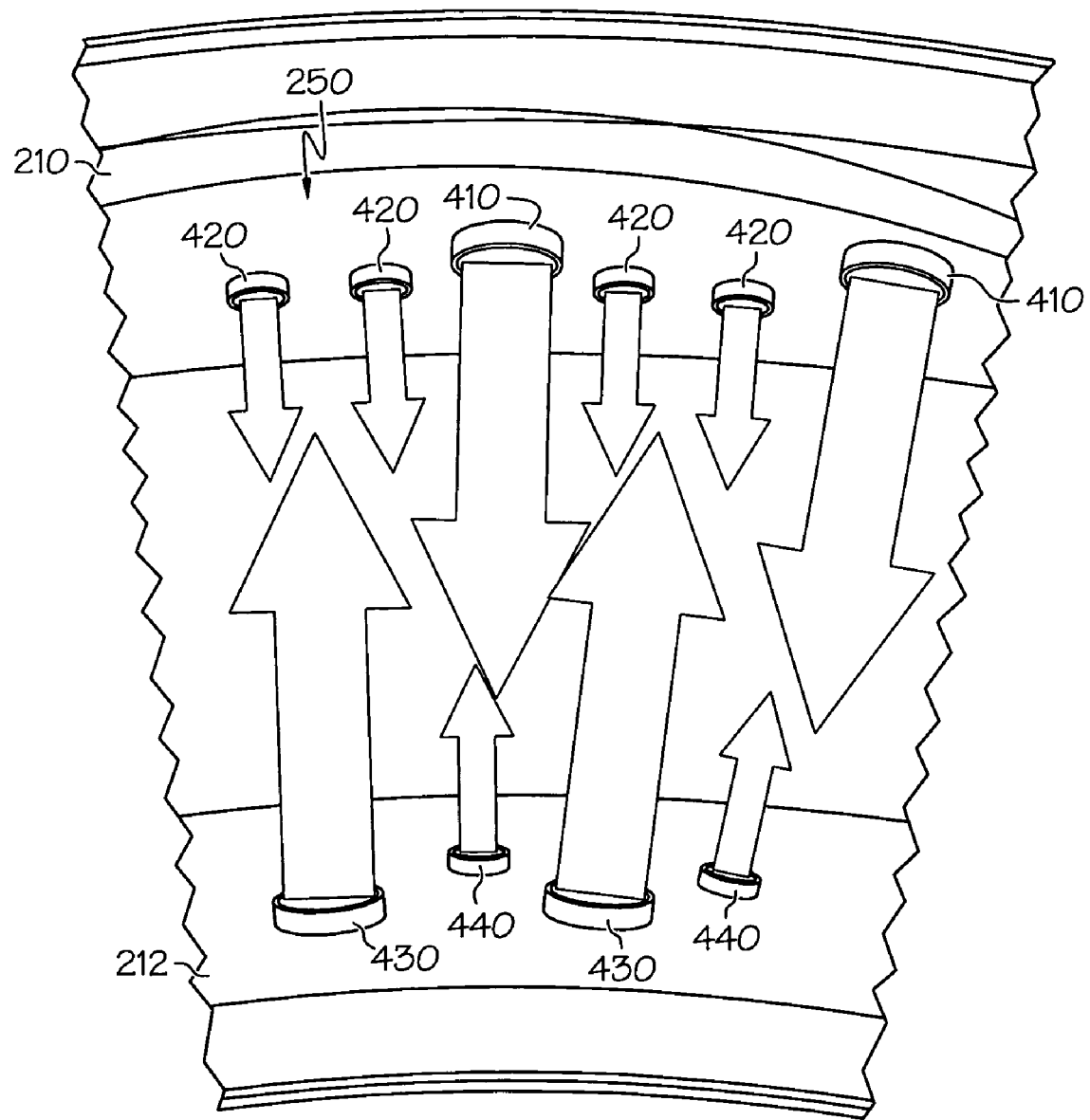
FIG. 4 is a partial, axial cross-sectional view of the combustor of FIG. 2.

FIG. 3 illustrates a partial perspective view of one embodiment of the combustor 208 taken from the top, rear and side perspective with a cross sectional portion of the combustor 208 removed for clarity. FIG. 4 illustrates a partial axial cross-sectional view of one embodiment of the combustor 208.

Referring to FIGS. 1-4, the outer liner 210 and inner liner 212 include a number of air admission holes, generically referenced as air admission holes 250. More particularly, the air admission holes 250 are separated into a first row 410 in the outer liner 210, a second row 420 in the outer liner 210 that is downstream of the first row 410, a third row 430 in inner liner 212, and a fourth row 440 in the inner liner 212 downstream of the third row 430. In general, the first, second, third, and fourth rows 410, 420, 430, 440 are distinct rows. In one embodiment, the trailing edges of the air admission holes 250 of each of the first and second rows 410, 420 are separated from the leading edges of the air admission holes 250 of each of the respective third and fourth rows 430, 440 by about 0.5 inches, although other distances are possible. As best shown in FIG. 4, each fuel injector 224 is associated with two air admission holes 250 in the first row 410, two air admission holes 250 in the third row 430, four air admission holes in the second row 420 of the outer liner 210 and two air admission holes in the fourth row 440 of the inner liner 212. Further characteristics of air admission holes 250 of these rows will be discussed in further detail below.

The first row 410 of air admission holes 250 of the outer liner 210 is generally aligned along the longitudinal axis of the combustor 208 with the third row 430 of air admission holes 250 of the inner liner 212, as best shown by FIG. 2. However, as best shown by FIG. 4, the first row 410 is circumferentially offset with respect to the third row 430.

The second row 420 of air admission holes 250 in the outer liner 210 and the third row 430 of air admission holes in the inner liner 212 are generally aligned with one another along the longitudinal axis of the combustor 208, as best shown in FIG. 2. However, as best shown in FIG. 4, the second row 420 of air admission holes in the outer liner 210 is circumferentially offset with respect to the fourth row 440 of air admission holes in the inner liner 212.

In one embodiment, the air admission holes 250 in the first row of 410 the outer liner 210 are circumferentially aligned with the fourth row 440 of the inner liner 212. The air admission holes of the second row 420 of the outer liner 210 can be generally circumferentially aligned with the air admission holes of the third row 430 of the inner liner 212; however, since there are four air admission holes in the second row 420 of the outer liner 210 for every two air admission holes in the third row 430 of the inner liner 212, two of the air admission holes in the second row 420 of the outer liner 210 are circumferentially centered around one of the air admission holes of the third row 430 of the inner liner 212 and the other two air admission holes of the second row 420 of the outer liner 210 are circumferentially centered around the other one of the air admission holes of the third row 430 of the inner liner 212.

Accordingly, as noted above, for each fuel injector 224, there are two air admission holes in the first row 410 of the outer liner 210, two air admission holes in the third row 430 of the inner liner 212, four air admission holes in the second row 420 of the outer liner 210, and two air admission holes in the fourth row 440 of the inner liner 212. Moreover, since the air admission holes of the first and third rows 410, 430 are circumferentially offset with respect to one another, and the air admission holes of the second and fourth rows 420, 440 are circumferentially offset with respect to one another, this configuration is designated a "staggered 2-2-4-2" configuration. In an embodiment with sixteen fuel injectors 224, there are a total of thirty-two air admission holes in the first row 410 of the outer liner 210, thirty-two air admission holes in the third row 430 of the inner liner 212, sixty-four air admission holes in the second row 420 of the outer liner 210, and thirty-two air admission holes in the fourth row 440 of the inner liner 212. In one embodiment, the staggered 2-2-4-2 configuration provides a proper amount of combustion air in a proper location. Additional jets may interfere with one another and/or not be the most efficient configuration. Of course, other arrangements are possible based on additional considerations.

With particular reference to FIG. 2, the operation of the combustor 208 will now be described. During operation, a portion of the pressurized air from the compressor enters a rich burn zone RB of the combustion chamber 214 by way of passages in the front end assembly 220. This air is referred to as primary combustion air because it intermixes with a stoichiometrically excessive quantity of fuel introduced through the fuel injectors 224 to support initial combustion in the rich burn zone RB. The rich stoichiometry of the fuel-air mixture in the rich burn zone produces a relatively cool flame, thus preventing excessive NOx formation and guarding against blowout of the combustion flame during any abrupt reduction in engine power.

The combustion products from the rich burn zone RB, which include unburned fuel, then enter a quench zone Q. Major jets 412, 432 flow from the plenums 216, 218 and into the quench zone Q through the first and third rows 410, 430 of air admission holes 250 in the outer and inner liners 210, 212. Downstream of the major jets 412, 432, minor jets 422, 442 flow from the plenums 216, 218 and into the quench zone Q through the second and fourth rows 420, 440 of air admission holes in the outer and inner liners 210, 212. The major and minor jets 412, 432; 422, 442 are referred to as dilution air because their purpose is to dilute or derich the combustion products from their stoichiometrically rich state at the forward edge of the quench zone Q to a stoichiometrically lean state at or just downstream of the aft edge of the quench zone Q. The air mixes with the combustion products entering the quench zone Q to support further combustion and release additional energy from the fuel. The air also rapidly leans the fuel rich combustion products as they flow axially through the quench zone Q and mix with the air. Initially, the fuel-air ratio of the combustion products changes from fuel rich to stoichiometric, causing an attendant rise in the combustion flame temperature. Since the quantity of NOx produced in a given time interval increases exponentially with flame temperature, substantial quantities of NOx can be produced during the initial quench process. As the quenching continues, the fuel-air ratio of the combustion products changes from stoichiometric to fuel lean, causing an attendant reduction in the flame temperature. However, until the mixture is diluted to a fuel-air ratio substantially lower than stoichiometric, the flame temperature remains high enough to generate considerable quantities of NOx. It is important for the dilution air to intermix intimately with the combustion products flowing through the combustion chamber 214 so that the fuel-air mixture quickly becomes both thoroughly blended and regularly distributed.

As also discussed in greater detail below, the major jets 412, 432 enter the combustion chamber 214 through the first and third rows 410, 430 of air admission holes in the outer and inner liners 210, 212 and typically penetrate radially inwardly beyond a meanline 230 of the combustion chamber 214 while also being swept axially downstream into the combustion products from the rich burn zone RB. The minor jets 422, 442 enter the combustion chamber 214 through the second and fourth rows 420, 440 of air admission holes in the outer and inner liners 210, 212. The minor jets 422, 442 of air help to dilute or quench the fuel-air mixture in the sectors of the combustion chamber 214 downstream of the major jets 412, 432 to complete the quench process.

As noted above, the first row 410 of the outer liner 210 is circumferentially aligned with the third row 430 of the inner liner 212, and the second row 420 of the inner liner 212 is circumferentially aligned with the fourth row 440 of the outer liner 210. Generally, the rows 400, 450, 410, 460 of air admission holes are sized and configured such that the amount of penetration of the major jets 412, 432 and the minor jets 422, 442 correspond to 100% of the height of the combustion chamber 214. For example, if the major jets 412 flowing through the air admission holes in the first row 410 of the outer liner 210 penetrate about 75% of the height of the combustion chamber 214, the minor jets 442 flowing through the air admission holes of the fourth row 440 of the inner liner 212 penetrate about 25% of the height of the combustion chamber 214. Similarly, if the major jets 432 flowing through the air admission holes in the third row 430 of the inner liner 212 penetrate about 75% of the height of the combustion chamber 214, the minor jets 422 flowing through the air admission holes of the second row 420 of the outer liner 210 penetrate about 25% of the height of the combustion chamber 214.

Moreover, due to the offset of the first and third rows 410, 430, the major jets 412 flowing through the outer liner 210 cooperate with the major jets 432 flowing through the inner liner 212 to ensure that dilution air spans radially across the entire combustion chamber annulus. By staggering the first and third rows 410, 430, impingement of the major jets 412, 432 is minimized and very little air is recirculated back upstream into the rich burn zone RB, thereby avoiding excessive NOx formation in the rich burn zone RB.

Finally, the combustion products from the quench zone Q enter a lean burn zone LB where the combustion process concludes. As the combustion products flow into the lean burn zone LB, the air jets 412, 422, 432, 442 are swept downstream and also continue to penetrate radially and spread out laterally and intermix thoroughly with the combustion gases.

Figure 5:
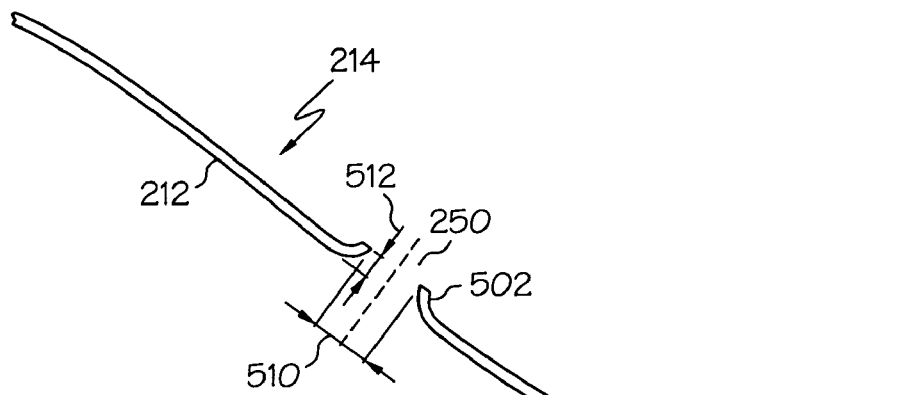
FIG. 5 is a cross-sectional view of a hole of the combustor of FIG. 2 in accordance with an exemplary embodiment.

FIG. 5 is a cross-sectional view of an exemplary air admission hole 250 of the combustor 208 and generally corresponds to portion 500 of FIG. 2, although it could also represent any of the air admission holes discussed herein. In particular, the air admission holes, such as air admission hole 250, are "plunged." In other words, a rim portion 502 of the air admission hole 250 extends into the combustion chamber 214. The plunged characteristics of the air admission holes 250 assist in the jets (e.g., jets 412, 422, 432, 442) in penetrating to the desired depth, as discussed above. Moreover, in one exemplary embodiment, the outer and inner liners 210, 212 have effusion holes that provide a cooling layer of air on the combustor side of the combustion chamber 214. Since this cooling layer is generally moving along the respective liner perpendicular to the major and minor jets, in conventional combustors, the cooling layer may interfere with the jets. However, in some exemplary embodiments, the plunged air admission holes 250 decrease or eliminate any interference with the effusion cooling layer.

In the embodiment shown in FIG. 5, the air admission holes 250 are formed from a single piece, either punched or molded into the liner (e.g., outer and inner liner 210, 212). In general, the air admission holes 250 may be circular or non-circular. The penetration depth of the jets (e.g., jets 412, 422, 432, 442) and the corresponding quantity of air admitted through the air admission holes may additionally be regulated by specifying the relative sizes (e.g., diameter 510 and length 512) of the air admission holes, i.e., a larger air admission hole 250 and/or a more plunged air admission hole 250 has a larger penetrative depth. As a result of this configuration, the temperature profile of the combustion gases can be adjusted, for example, by adjusting the size and depth of the air admission holes in the first, second, third, and fourth rows 410, 420, 430, 440, without compromising fuel-air mixing, which could lead to elevated levels of NOx.

An exemplary diameter of the air admission holes in the first and third rows 410, 430 is about 0.4 inches, and exemplary diameter of air admission holes in the second and fourth rows 420, 440 is about 0.25 inches, although the diameters can vary and can be scaled for larger and smaller engines. In one embodiment, the diameters of the air admission holes in the first row 410 of the inner liner 212 are equal to the diameters of the air admission holes in the third row 430 of the outer liner 210, and the diameters of the air admission holes in the second row 420 of the inner liner 212 are equal to the diameters of the air admission holes in the fourth row 440 of the outer liner 210.

In one embodiment, the plunge radius of curvature and depth of the air admission hole may depend on material thickness and hole diameter. For example, with a 0.02 inch diameter hole, the plunge radius of curvature may be 0.080 to 0.100 inches to create a desirable flow inlet. The plunge radius of curvature in thicker material it may be larger, such as about 0.150 inches. In one embodiment, the depth of the air admission hole may be between 0.075 to 0.150 inches. In general, the depth may be sufficient to extend through the cooling film and provide some reduction of the discharge coefficient.

Figure 6:
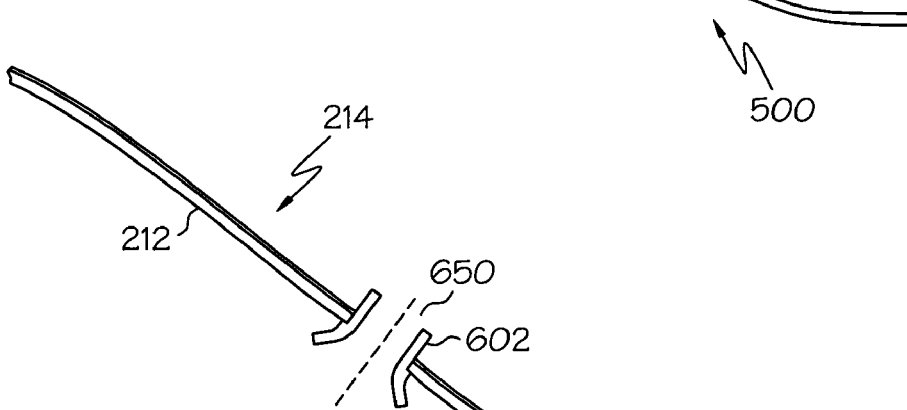
FIG. 6 is a cross-sectional view of a hole of the combustor of FIG. 2 in accordance with an exemplary embodiment.

FIG. 6 is a cross-sectional view of an air admission hole 650 in accordance with an alternate exemplary embodiment that generally corresponds to the air admission holes 250 discussed above. In this embodiment, the air admission hole 650 is plunged with an insert 602, which can be manufactured separately and installed in the outer or inner liner 210, 212.

Figure 7:
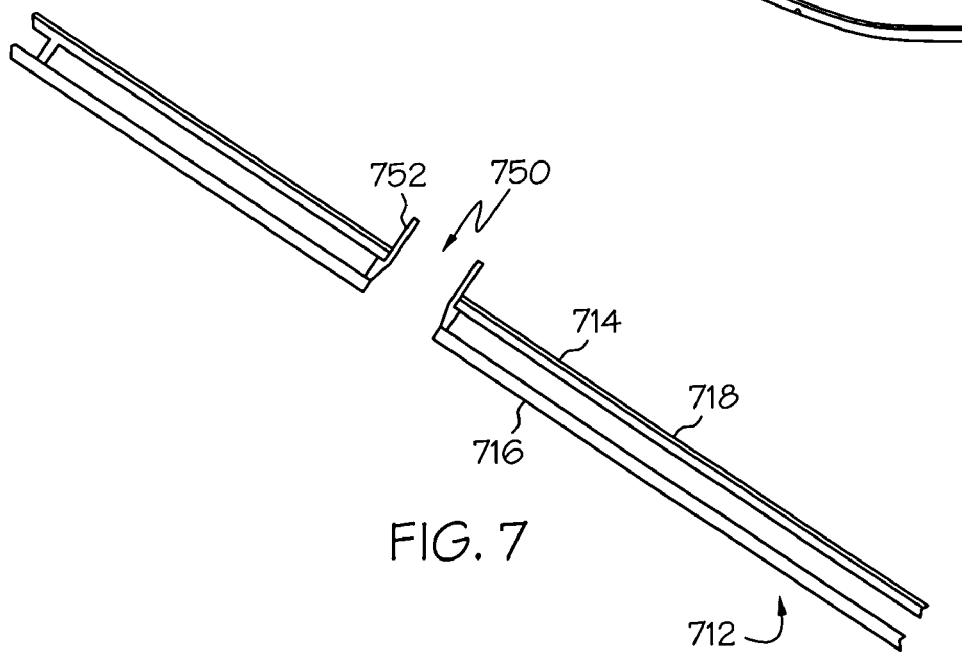
FIG. 7 is a cross-sectional view of a hole of an alternate combustor in accordance with an exemplary embodiment.

FIG. 7 is a cross-sectional view of a portion of a combustor liner 712 in accordance with an additional exemplary embodiment. In this embodiment, the combustor liner 712 can be the inner or outer liner in a combustor similar to those described above. Moreover, the combustor liner 712 is a dual wall liner with a first, inner wall 714 and a second, outer wall 716 that may increase the cooling effects of the combustor walls. Typically, in a dual wall configuration, the inner wall 714 includes a plurality of cooling tiles or heat shields 716. This improved cooling may lead to additional air available for the combustion process and a corresponding decrease in unwanted emissions.

In this particular embodiment, one or more air admission holes 750 are formed in the liner 712 and include an insert 752 to guide air through the outer wall 716 and inner wall 714 into a combustion chamber 754. Like the air admission holes described above, the air admission holes 750 are plunged and include at least a portion of the insert 752 that extends into the combustion chamber 754. This arrangement may decrease or eliminate any interference with an effusion cooling layer, and may additional enable to a greater mixing of air in the quench zone, decreased emissions, and increased cooling efficiency.

In any of the embodiments discussed above, particularly the embodiments in FIGS. 5-7, the inlets and/or outlets of the air admission holes 250, 650, 750 may be modified as necessary or desired. For example, the inlets of the air admission holes 250, 650, 750 may be a non-circular shape, including rectangular, racetrack, oval, and square.

Accordingly, in some embodiments, the plunged nature, circumferential distribution, and axial alignment of the air admission holes 250, 650, 750 not only mitigate NOx formation as described above, but also adjust the peak temperature and spatial temperature profile of the exhaust gases entering the turbine module. Evaluations using computational fluid dynamics (CFD) techniques have shown the efficacy of the combustor with the staggered 2-2-4-2 configuration of one embodiment.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
an outer liner having a first row and a second row of circumferentially distributed air admission holes penetrating therethrough, the second row of the outer liner being downstream of the first row of the outer liner, and the air admission holes of the first row of the outer liner being larger than the air admission holes of the second row of the outer liner;
an inner liner circumscribed by the outer liner and having a third row and a fourth row of circumferentially distributed air admission holes penetrating therethrough, the fourth row of the inner liner being downstream of the third row of the inner liner, the air admission holes of the third row of the inner liner being larger than the air admission holes of the fourth row of the inner liner, and the inner and outer liners forming a combustion chamber, wherein at least a portion of the air admission holes of each of the first, second, third, or fourth rows are plunged,
a plurality of fuel injectors extending into the combustion chamber and configured to deliver an air-fuel mixture to the combustion chamber, each of the plurality of fuel injectors being associated with two air admission holes in the first row, two air admission holes in the third row, four air admission holes in the second row, and two air admission holes of the fourth row, wherein the third row of air admission holes is generally aligned with the first row of air admission holes in a longitudinal direction, the fourth row of air admission holes is generally aligned with the second row of air admission holes in the longitudinal direction, and the fourth row of air admission holes is circumferentially offset with respect to the first row of air admission holes, wherein the combustion chamber defines a rich burn zone, a quench zone, and a lean burn zone, the first and second rows of air holes in the inner and outer liners introducing air jets into quench zone, and wherein the inner liner and outer liner each further defines effusion cooling holes that respectively provide a cooling layer of air around the plunged air admission holes of the first, second, third and fourth rows.

2. The combustor of claim 1, wherein all of the air admission holes in the first or second rows are plunged.

3. The combustor of claim 1, wherein all of the air admission holes in the third or fourth rows are plunged.

4. The combustor of claim 1, wherein all of the air admission holes in the first, second, third, and fourth rows are plunged.

5. The combustor of claim 1, wherein the air admission holes in the first and second rows are integral with the outer liner.

6. The combustor of claim 1, wherein each of the air admission holes in the first and second rows includes an insert that extends into the combustion chamber.

7. The combustor of claim 1, wherein the outer liner includes a first wall and a second wall, and wherein each of the air admission holes of the first and second rows includes an insert that extends through the first wall, through the second wall, and into the combustion chamber.

8. The combustor of claim 1, wherein the at least a portion of the air admission holes that are plunged are integral with the respective liner.

9. The combustor of claim 1, wherein the fourth row of air admission holes is circumferentially offset with respect to the second row of air admission holes.

10. The combustor of claim 1, wherein the first row of air admission holes is generally circumferentially aligned with the fourth row of air admission holes.

11. The combustor of claim 1, wherein each two of the air admission holes of the second row are circumferentially centered around a respective one of the air admission holes of the third row.

12. The combustor of claim 1, wherein the air admission holes of the first and third rows each have a first diameter, the air admission holes of the second and fourth rows each have a second diameter, and the ratio of the first diameter to the second diameter is about 1.6 to 1.

13. A method for combusting an air-fuel mixture in a combustor with an inner liner and an outer liner that define a combustor chamber therebetween, the method comprising:
directing first major and minor jets respectively through first and second rows of plunged air admission holes in the outer liner;
directing second major and minor jets respectively through third and fourth rows of plunged air admission holes in the inner liner;
introducing and mixing fuel with the first major and minor jets and the second major and minor jets; and
igniting the air-fuel mixture, wherein the combustor includes
a plurality of fuel injectors extending into the combustion chamber and configured to deliver an air-fuel mixture to the combustion chamber, each of the plurality of fuel injectors being associated with two air admission holes in the first row, two air admission holes in the third row, four air admission holes in the second row, and two air admission holes of the fourth row, wherein the third row of air admission holes is generally aligned with the first row of air admission holes in a longitudinal direction, the fourth row of air admission holes is generally aligned with the second row of air admission holes in the longitudinal direction, and the third row of air admission holes in the inner liner is circumferentially offset with respect to the second row of air admission holes, wherein the combustion chamber defines a rich burn zone, a quench zone, and a lean burn zone, the first and second rows of air holes in the inner and outer liners introducing air jets into quench zone, and wherein the inner liner and outer liner each further defines effusion cooling holes that respectively provide a cooling layer of air around the plunged air admission holes of the first, second, third and fourth rows.

14. The method of claim 13, wherein the air admission holes in the first and second rows are integral with the outer liner and the air admission holes in the third and fourth rows are integral with the inner liner.

15. The method of claim 13, wherein each of the air admission holes in the first, second, third and fourth rows includes an insert that extends into the combustion chamber.

16. The method of claim 13, wherein the outer liner includes a first wall and a second wall, and wherein each of the air admission holes of the first and second rows includes an insert that extends through the first wall, through the second wall, and into the combustion chamber.

17. A combustor for a turbine engine, comprising:
an outer liner having a first row and a second row of circumferentially distributed plunged air admission holes penetrating therethrough, the second row of the outer liner being downstream of the first row of the outer liner, and the air admission holes of the first row of the outer liner being larger than the air admission holes of the second row of the outer liner;
an inner liner circumscribed by the outer liner and forming a combustion chamber therewith, the inner liner including a third row and a fourth row of circumferentially distributed plunged air admission holes penetrating therethrough, the fourth row of the inner liner being downstream of the third row of the inner liner, the air admission holes of the third row of the inner liner being larger than the air admission holes of the fourth row of the inner liner;
a plurality of fuel injectors extending into the combustion chamber and configured to deliver an air-fuel mixture to the combustion chamber, each of the plurality of fuel injectors being associated with two air admission holes in the first row, two air admission holes in the third row, four air admission holes in the second row, and two air admission holes of the fourth row, wherein the third row of air admission holes is generally aligned with the first row of air admission holes in a longitudinal direction, the fourth row of air admission holes is generally aligned with the second row of air admission holes in the longitudinal direction, the fourth row of air admission holes is circumferentially offset with respect to the first row of air admission holes, and the second row of air admission holes is circumferentially offset with respect to the third row of air admission holes, wherein the combustion chamber defines a rich burn zone, a quench zone, and a lean burn zone, the first and second rows of air holes in the inner and outer liners introducing air jets into quench zone, and wherein the inner liner and outer liner each further defines effusion cooling holes that respectively provide a cooling layer of air around the plunged air admission holes of the first, second, third and fourth rows.

* * * * *